N. SIMPSON.
Bee Hive.
No. 65,020.
Patented May 21, 1867.
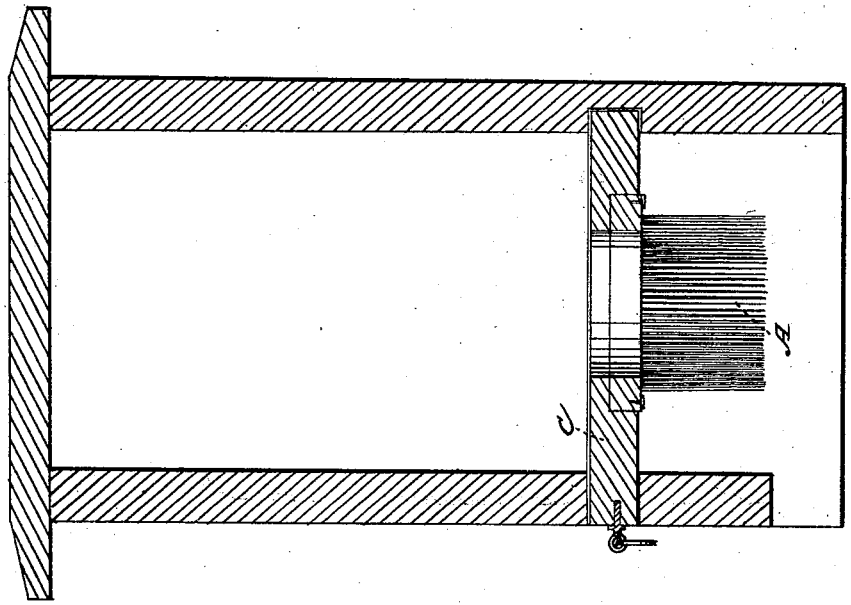
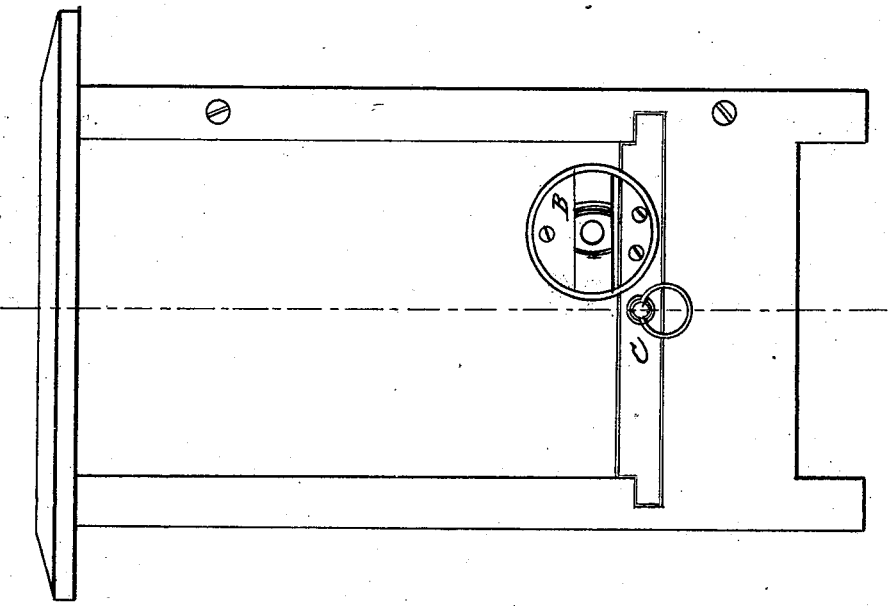
WITNESSES:
F. H. Phillips
Geo. C. Landucher
INVENTOR:
Nath Simpson
by his Atty
A. H. Evans

United States Patent Office.

NATHAN SIMPSON, OF POMEROY, OHIO.

Letters Patent No. 65,020, dated May 21, 1867.

---

IMPROVEMENT IN BEE-HIVES.

---

The Schedule referred to in these Letters Patent and making part of the same.

---

TO WHOM IT MAY CONCERN:

Be it known that I, NATHAN SIMPSON, of Pomeroy, Meigs county, Ohio, have invented a new and improved Entrance for and to a Bee-Hive; and I do hereby declare that the following is a full and exact description, reference being had to the accompanying drawings, and to the letters of reference thereon.

The nature of my invention consists in providing any style of bee-hive with a bottom and top of any shape, flat, convex, cone-shaped, or pyramidal; if flat, with a round aperture in the centre of each; if convex, cone-shaped, or pyramidal, with a round aperture in the apex of each, around which apertures there is fixed a row or series of rows of fine galvanized needles so close together as to prevent the smallest worm from the bee-moth to pass between them. Through this aperture, surrounded by this row or this series of rows of needles passing from and fixed to the inner part of the hive, in the centre of the aperture surrounded by these rows of needles, is a tongue of wood upon which the bee alights, and by which she ascends or descends into the hive.

To enable others to understand my invention, and the theory upon which the invention is based, I will proceed to describe its operations.

The bee-moth deposits her egg in the cracks, crevices, and joints of the hive, mainly from the outside, which, being hatched by the heat of the sun and the internal heat of the hive, crawls inside and takes up its habitation with and feasts on the honey stores of the bee. The bee, when he finds his territory invaded, makes war upon the aggressor, and drags him from his cocoon and expels him from the hive. Now, if this ouster was sufficient to rid the hive of this worm, and it only required one expulsion for each worm, the bee would soon clear her habitation of the intruders, and the moth would be no formidable enemy to the bee. But as soon as the worm is cast out, he crawls up and re-enters the hive and renews his ravages, and this he will repeat again and again until the bee becomes discouraged in her efforts to rid her premises, and surrenders at discretion. Now, this worm, like the fly, can walk upon the ceiling, though it be of glass, and can go wherever the bee can, except upon the wing, and hence when expelled by the bee can re-enter any hive that has yet been invented of which I have any knowledge; and to prevent this re-entrance by the worm this new entrance for the bee is invented. The worm, after being expelled by the bee from this new hive, crawls up the supports thereof, whatever they may be, and makes headway along the bottom until he comes to the entrance surrounded by the row or series of rows of needles, A. He cannot pass between them, and if he enters at all he must pass down them and round, too, over the sharp point of a fine needle, which is impossible. Indeed, it is next to impossible for him to even crawl down to the point of a fine needle, the surface thereof being too limited for his clumsy feet, but if by good luck he should reach the points and make an effort to crawl over them, he is pricked in the neck and precipitated to the ground, and thus baffled, and his re-entrance cut off forever.

What I claim as my invention, and desire to secure by Letters Patent, is—

Applying and arranging, around the entrance to the bee-hive, needles, or other sharp-pointed pieces of metal, substantially as set forth, and for the purpose stated in the foregoing specification.

NATHAN SIMPSON.

Witnesses:
   W. H. LASLEY,
   P. B. STANBERY.